United States Patent
Narikawa et al.

(10) Patent No.: US 12,386,933 B2
(45) Date of Patent: Aug. 12, 2025

(54) ANALYSIS DEVICE AND AUTHENTICATION METHOD

(71) Applicant: HITACHI HIGH-TECH CORPORATION, Tokyo (JP)

(72) Inventors: Sakiko Narikawa, Tokyo (JP); Takayuki Noda, Tokyo (JP); Tetsuya Nishida, Tokyo (JP); Keiichi Kobayashi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 261 days.

(21) Appl. No.: 18/011,207

(22) PCT Filed: Jul. 10, 2020

(86) PCT No.: PCT/JP2020/027060
§ 371 (c)(1),
(2) Date: Dec. 19, 2022

(87) PCT Pub. No.: WO2022/009423
PCT Pub. Date: Jan. 13, 2022

(65) Prior Publication Data
US 2023/0229745 A1    Jul. 20, 2023

(51) Int. Cl.
*G06F 21/32* (2013.01)
(52) U.S. Cl.
CPC .................. *G06F 21/32* (2013.01)
(58) Field of Classification Search
CPC ....................................... G06F 21/32
See application file for complete search history.

(56) References Cited

U.S. PATENT DOCUMENTS 8,209,196 B2 * 6/2012 Ariyoshi ............... G16H 10/60
705/2
8,627,417 B2    1/2014 Aoyama
(Continued)

FOREIGN PATENT DOCUMENTS

JP    2005165808 A    6/2005
JP    2006092018 A    4/2006
(Continued)

OTHER PUBLICATIONS

International Search Report of PCT/JP2020/027060 dated Oct. 13, 2020.

*Primary Examiner* — Dhairya A Patel
(74) *Attorney, Agent, or Firm* — MATTINGLY & MALUR, PC

(57) ABSTRACT

An analysis device according to the present disclosure, which obtains data about a sample, is characterized by comprising: a placement unit on which the sample is placed; a data obtaining unit which obtains data about the sample; a user interface unit which allows a user to make access to processing of the analysis device; a communication unit which communicates with an online authentication unit that authenticates the user online; an offline authentication unit which authenticates the user offline when the communication unit cannot communicate with the online authentication unit; and a restriction unit which restricts the processing accessible to the user when the user is authenticated by the offline authentication unit as compared to when the user is authenticated by the online authentication unit.

13 Claims, 14 Drawing Sheets

(56) References Cited

U.S. PATENT DOCUMENTS

| | | | | |
|---|---|---|---|---|
| 10,891,834 | B2* | 1/2021 | Ozasa | G07F 19/203 |
| 11,321,437 | B2* | 5/2022 | Suwald | H04L 63/18 |
| 11,693,980 | B2* | 7/2023 | Kim | G06F 21/31 |
| | | | | 726/4 |
| 2006/0064753 | A1 | 3/2006 | Otake et al. | |
| 2006/0288424 | A1* | 12/2006 | Saito | H04N 21/8355 |
| | | | | 375/E7.009 |
| 2014/0101721 | A1 | 4/2014 | Nagase et al. | |
| 2016/0156219 | A1* | 6/2016 | Copeland | H02J 50/20 |
| | | | | 307/52 |
| 2016/0253458 | A1* | 9/2016 | Balwani | H04L 63/105 |
| | | | | 705/2 |
| 2019/0278897 | A1* | 9/2019 | Zhang | G08G 5/55 |
| 2020/0302043 | A1* | 9/2020 | Vachon | G06F 21/36 |
| 2021/0209655 | A1* | 7/2021 | Post, Jr. | G06F 21/32 |
| 2022/0038448 | A1* | 2/2022 | DeFilippo | H04L 67/12 |

FOREIGN PATENT DOCUMENTS

| | | |
|---|---|---|
| JP | 2007-067849 A | 3/2007 |
| JP | 2008-40644 A | 2/2008 |
| JP | 2010140222 A | 6/2010 |
| JP | 2011033536 A | 2/2011 |
| JP | 2011076377 A | 4/2011 |
| JP | 2014-096133 A | 5/2014 |

* cited by examiner

[FIG. 1]
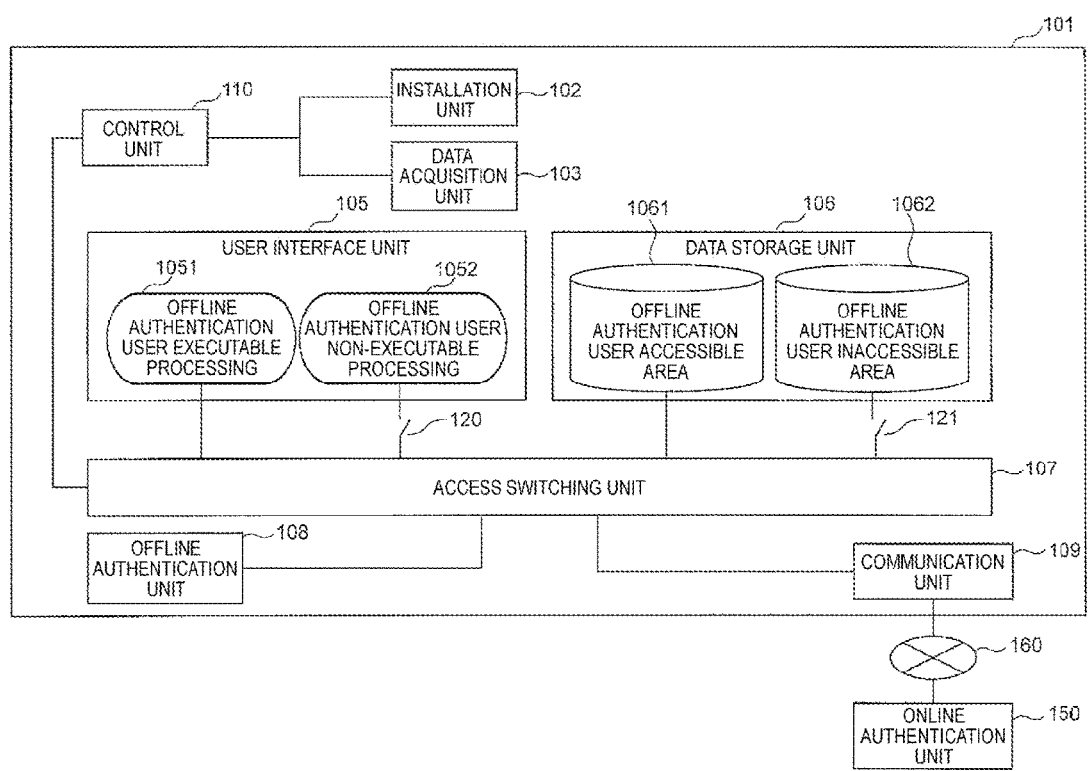

[FIG. 2]
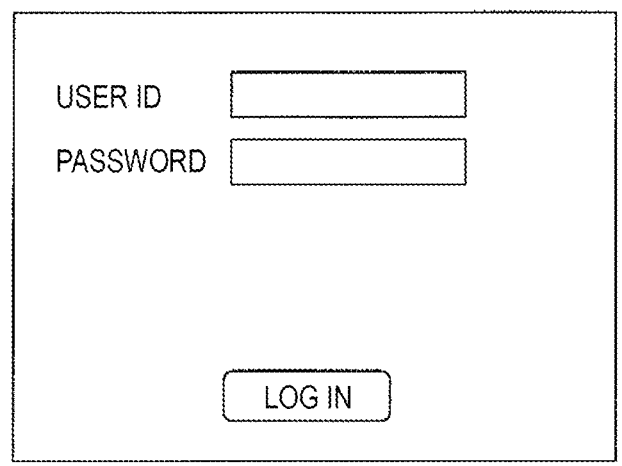

[FIG. 3]
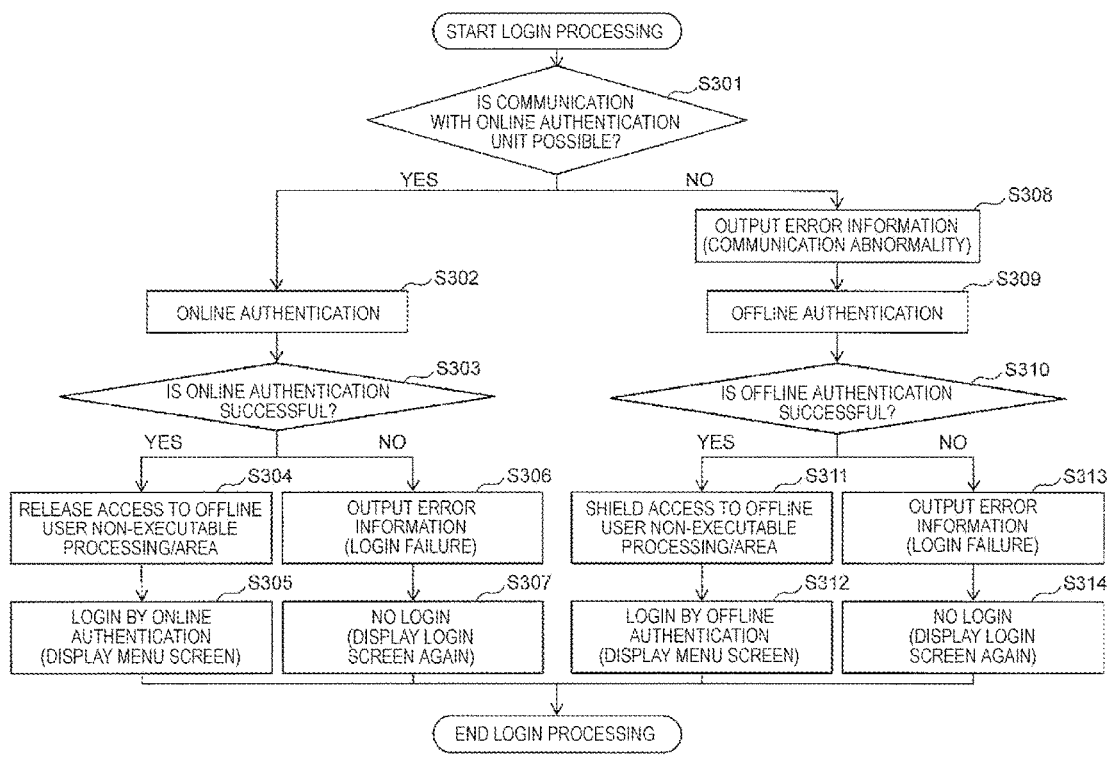

[FIG. 4]
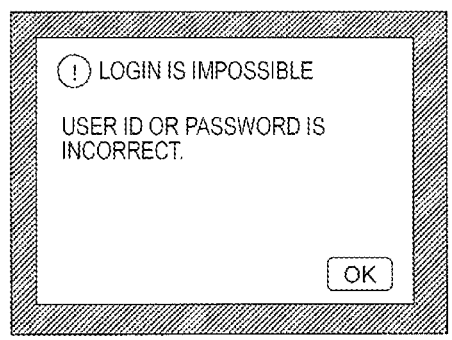
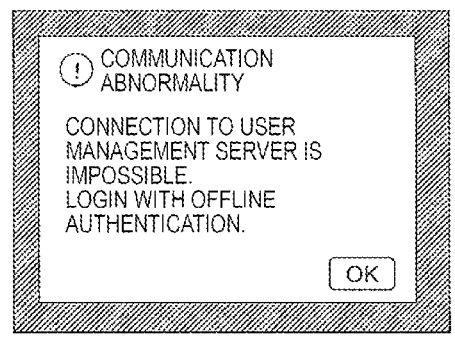
(a) DIALOG SCREEN
(LOGIN FAILURE)
(b) DIALOG SCREEN
(COMMUNICATION ABNORMALITY)

[FIG. 5]
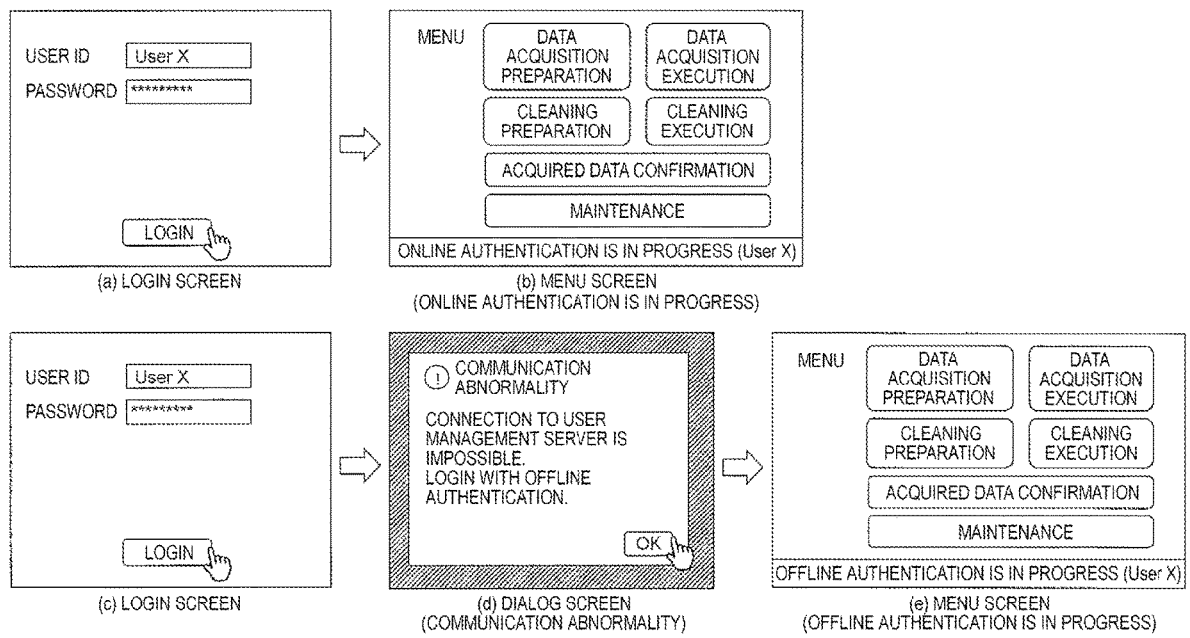

[FIG. 6]

| CLASSIFICATION | NUMBER | CONTENTS OF PROCESSING | OFFLINE AUTHENTICATION USER EXECUTION STATUS |
|---|---|---|---|
| (a) DATA ACQUISITION | (a-1) | DATA ACQUISITION PREPARATION (INSTALLATION OF WASTE LIQUID TANK, REAGENT, SAMPLE, AND LIKE REQUIRED FOR DATA ACQUISITION OF BIOLOGICAL SAMPLE) | IMPOSSIBLE |
| | (a-2) | DATA ACQUISITION EXECUTION (ACQUISITION OF BIOLOGICAL SAMPLE DATA) | IMPOSSIBLE |
| (b) CLEANING | (b-1) | CLEANING PREPARATION (INSTALLATION OF WASTE LIQUID TANK, REAGENT, SAMPLE, AND LIKE REQUIRED FOR CLEANING) | POSSIBLE |
| | (b-2) | CLEANING EXECUTION (CLEANING OF FLOW PATH INSIDE PIPING) | POSSIBLE |
| (c) DATA CONFIRMATION | (c-1) | REFERENCE OF DATA ON BIOLOGICAL SAMPLE AND ANALYSIS RESULT THEREOF | IMPOSSIBLE |
| | (c-2) | EDITING OF DATA ON BIOLOGICAL SAMPLE AND ANALYSIS RESULT THEREOF | IMPOSSIBLE |
| | (c-3) | DUPLICATION OF DATA ON BIOLOGICAL SAMPLE AND ANALYSIS RESULT THEREOF | IMPOSSIBLE |
| | (c-4) | TRANSFER OF DATA ON BIOLOGICAL SAMPLE AND ANALYSIS RESULT THEREOF | IMPOSSIBLE |
| | (c-5) | DELETION OF DATA ON BIOLOGICAL SAMPLE AND ANALYSIS RESULT THEREOF | IMPOSSIBLE |
| (d) MAINTENANCE | (d-1) | ALARM CONFIRMATION (CONFIRMATION OF GENERATED ALARM) | POSSIBLE |
| | (d-2) | DEVICE STATUS CONFIRMATION (CONFIRMATION OF OPERATION HISTORY AND STATUS OF CONSUMABLES) | POSSIBLE |

[FIG. 7]
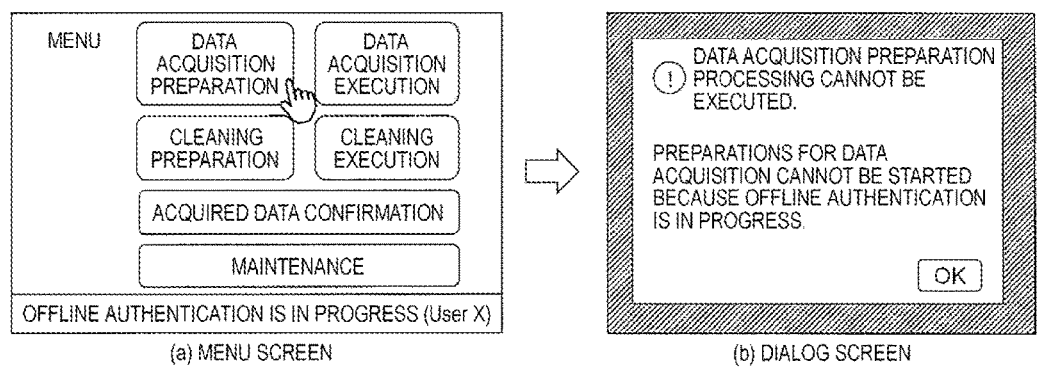

[FIG. 8]
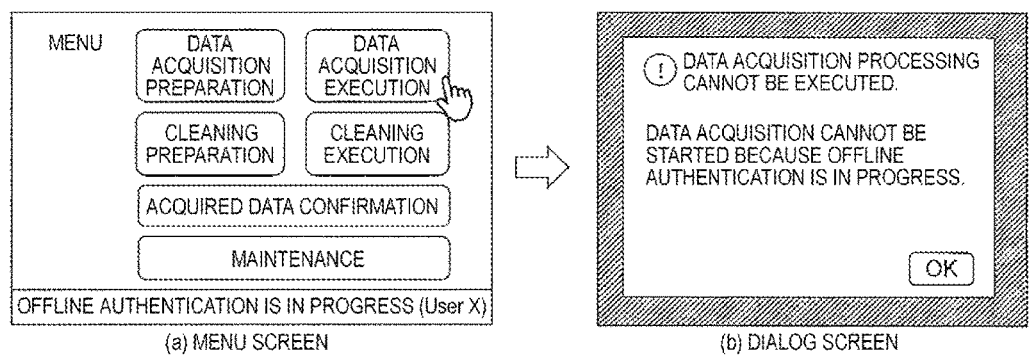

[FIG. 9]
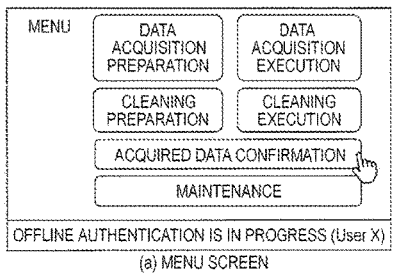
(a) MENU SCREEN
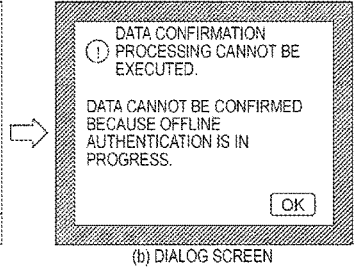
(b) DIALOG SCREEN
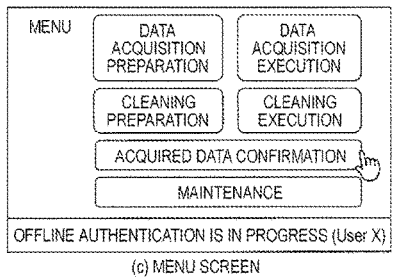
(c) MENU SCREEN
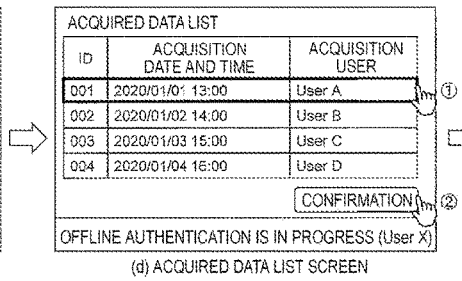
(d) ACQUIRED DATA LIST SCREEN
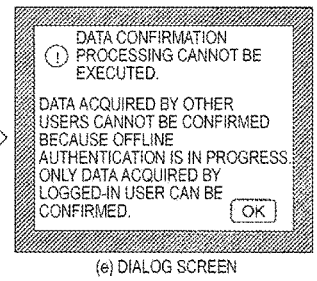
(e) DIALOG SCREEN

[FIG. 10]
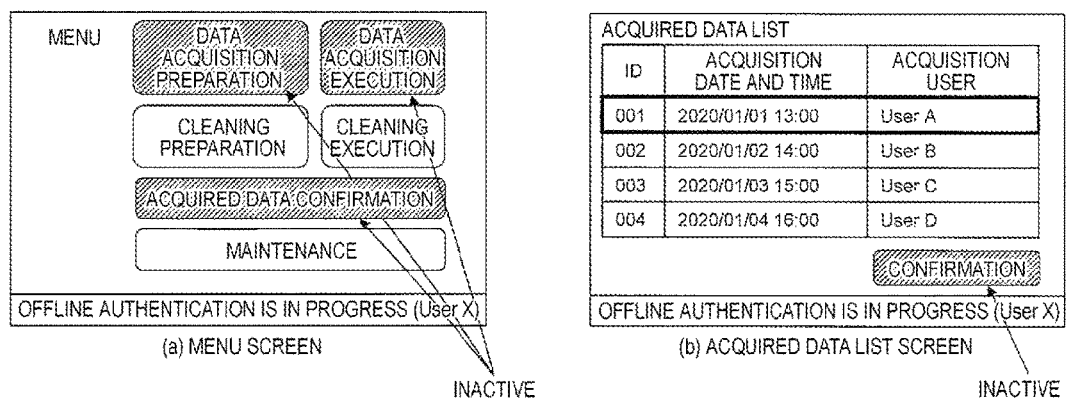

[FIG. 11]
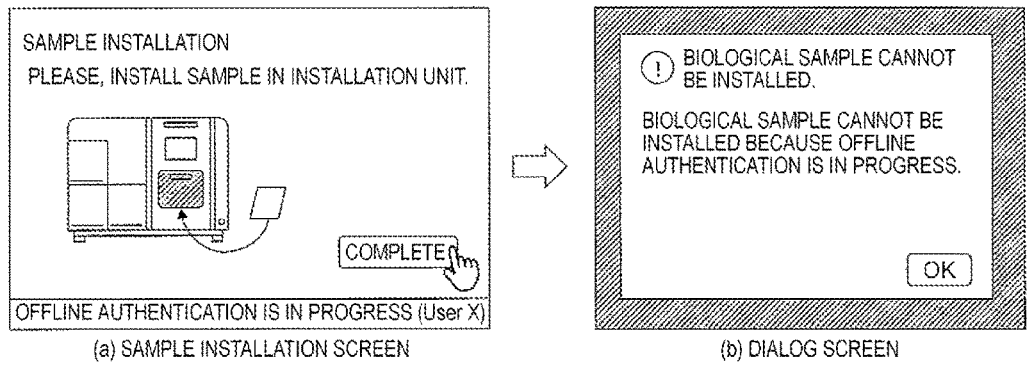
(a) SAMPLE INSTALLATION SCREEN  (b) DIALOG SCREEN

[FIG. 12]
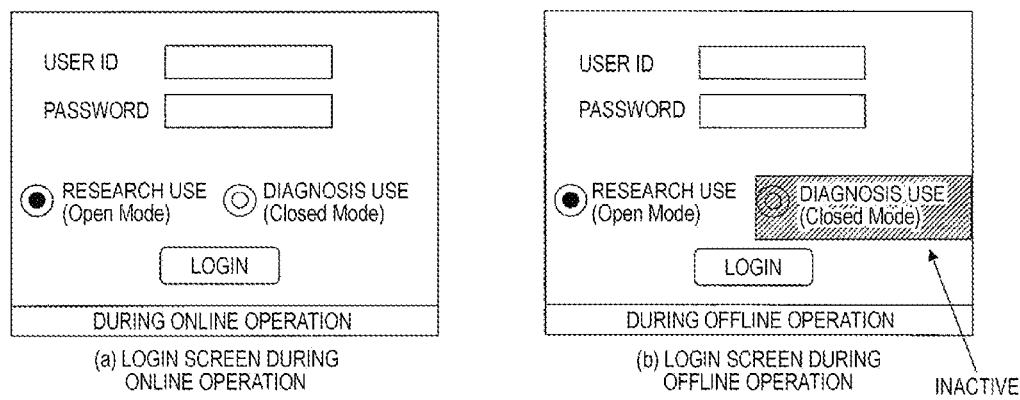
(a) LOGIN SCREEN DURING ONLINE OPERATION
(b) LOGIN SCREEN DURING OFFLINE OPERATION

[FIG. 13]
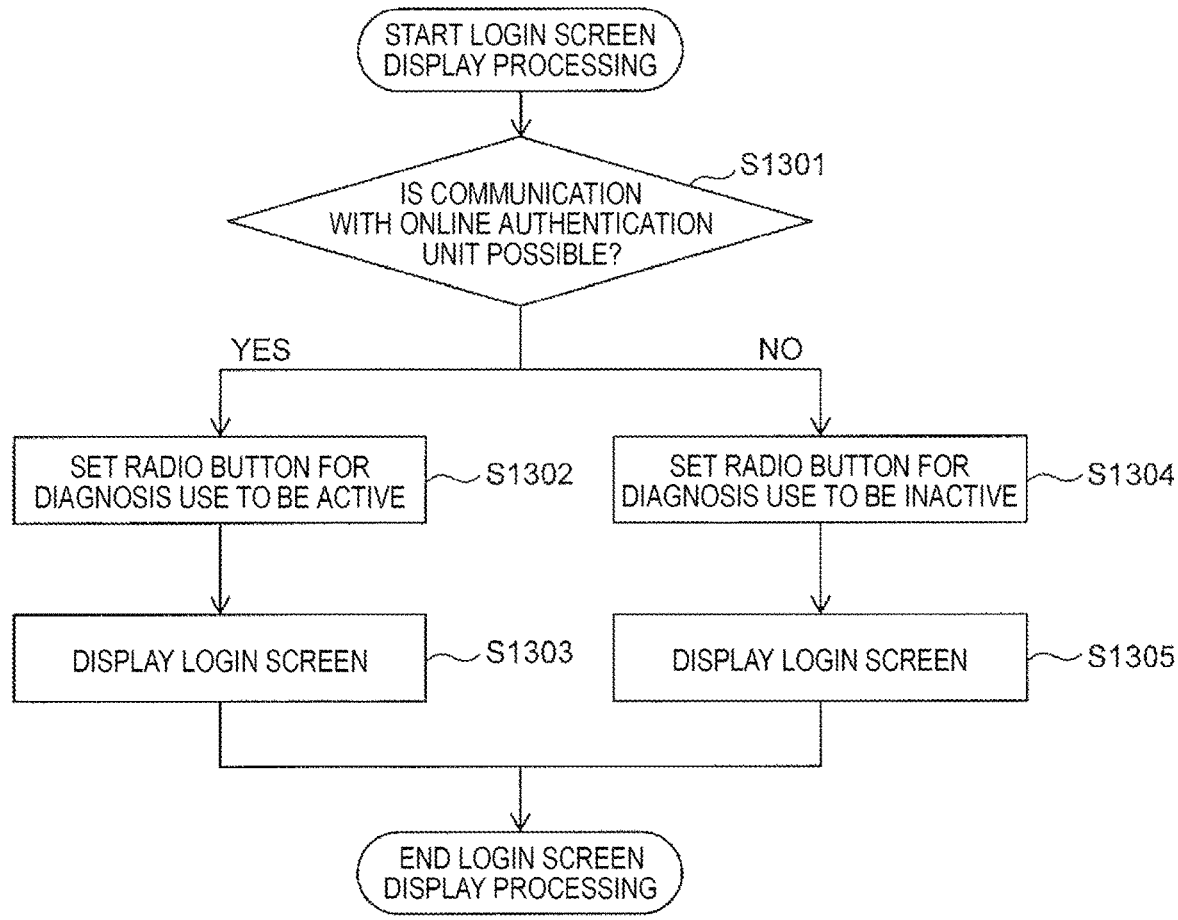

[FIG. 14]
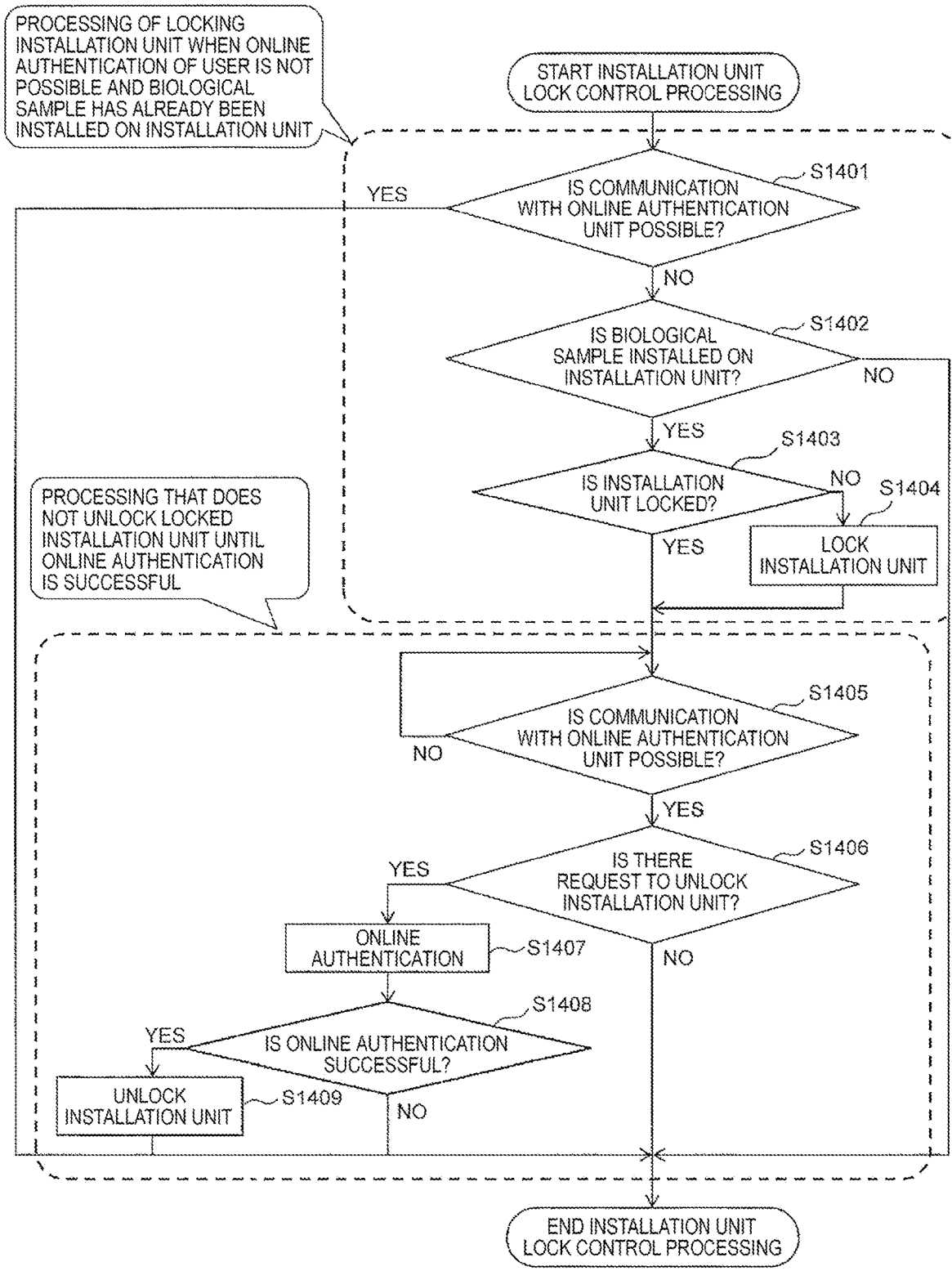

ANALYSIS DEVICE AND AUTHENTICATION METHOD

TECHNICAL FIELD

The present disclosure relates to an analysis device and an authentication method.

BACKGROUND ART

An analysis device configured to acquire biological sample data (for example, biochemical automatic analysis device) deals with personal information of a donor of a biological sample and confidential information such as an analysis result of the biological sample, and as such, from the viewpoint of confidentiality protection, the analysis device generally has an authentication function of requiring a user of the device to perform authentication such as an input of a password.

A method of authenticating a user can be broadly classified into online authentication in which a biological sample analysis device and an authentication server are connected via a network and authentication processing is performed on the authentication server, and offline authentication in which the authentication processing is performed only using the biological sample analysis device.

JP2008-40644A (PTL 1) discloses, as a login management method, "an object thereof is to enable all login target devices to perform simultaneous login processing with a single login operation", and as a solution to this problem, "a login management method on a server in which a plurality of information processing devices are connected, a login request from a first information processing device is received and login processing is performed in a specified second information processing device, the method characterized by including: a login request receiving step of receiving an account and user unique information from the first information processing device in response to a login request from the first information processing device; an authentication processing step of authenticating the login request from the first information processing device based on a correspondence relationship between the account and the user unique information received from the first information processing device and an account and user unique information registered in advance in the server; and a login request transmission step of transmitting the login request including a password corresponding to the authenticated account to the second information processing device" (refer to ABSTRACT and Claim 1 in PTL 1).

CITATION LIST

Patent Literature

PTL 1: JP2008-40644A

SUMMARY OF INVENTION

Technical Problem

In PTL 1, an information processing device and a login management server are connected via a network, and user authentication processing is performed online. Since online authentication centrally manages user information on an authentication server and performs user authentication by common processing, the online authentication has advantages of improving user convenience and security during authentication. On the other hand, there is a problem in that the authentication processing cannot be performed when communication with the authentication server becomes impossible. PTL 1 does not consider a case in which the information processing device cannot communicate with the login management server due to reasons such as network disconnection.

Since offline authentication stores authentication information inside an analysis device or uses an authentication method unique to the analysis device, authentication security level of the offline authentication is lower than that of the online authentication. In addition, user management is complicated, and it is difficult to maintain the security level. Therefore, when a user is allowed to log in using the offline authentication, it is necessary to take measures to safely manage confidential data handled by the device.

In a case where only online authentication is available, when the online authentication fails, a user cannot log in to an analysis device at all and cannot operate the analysis device, and as such, maintenance performance of the analysis device deteriorates. In order to solve this problem, a method of performing offline authentication is considered when communication with the authentication server becomes impossible.

In consideration of the above-described problems, the present disclosure proposes a technique of safely managing confidential data handled by a device while maintenance performance of the device is maintained.

Solution to Problem

In order to solve the above-described problems, an analysis device of the present disclosure is an analysis device configured to acquire data related to a sample, characterized by including: an installation unit configured to install the sample thereon, a data acquisition unit configured to acquire the data related to the sample, a user interface unit configured to allow a user to access processing of the analysis device, a communication unit configured to communicate with an online authentication unit configured to authenticate the user online, an offline authentication unit configured to authenticate the user offline when the communication unit cannot communicate with the online authentication unit, and a restriction unit configured to restrict processing accessible by the user more when the user is authenticated by the offline authentication unit than when the user is authenticated by the online authentication unit.

Further features related to the present disclosure will become apparent from the descriptions of this specification and the accompanying drawings thereof. In addition, aspects of the present disclosure will be achieved and realized by elements, combinations of various elements, and aspects of the subsequent detailed description and the attached scope of the claims.

The description in this specification is merely an example and is not intended to limit the scope of the claims or application of the present disclosure in any sense.

Advantageous Effects of Invention

According to a technique of the present disclosure, it is possible to safely manage confidential data handled by a device while maintenance performance of the device is maintained.

Problems, configurations, and effects other than those described above will be clarified by the description of the following embodiments.

BRIEF DESCRIPTION OF DRAWINGS

FIG. 1 is a functional configuration diagram of a biological sample analysis device according to a first embodiment.

FIG. 2 is a diagram showing an example of a login screen.

FIG. 3 is a flowchart showing login processing.

FIG. 4 is a diagram showing an example of a dialog screen in the login processing.

FIG. 5 is a diagram showing an example of screen transition when authentication of the login processing is successful.

FIG. 6 is a diagram showing a list of processing in the biological sample analysis device.

FIG. 7 is a diagram showing an example of screen transition in a case where data acquisition preparation processing is selected when offline authentication is in progress.

FIG. 8 is a diagram showing an example of screen transition in a case where data acquisition execution processing is selected when the offline authentication is in progress.

FIG. 9 is a diagram showing an example of screen transition in a case where data confirmation processing is selected when the offline authentication is in progress.

FIG. 10 is a diagram showing another example of a menu screen when the offline authentication is in progress.

FIG. 11 is a diagram showing another example of the screen transition in the case where the data acquisition preparation processing is selected when the offline authentication is in progress.

FIG. 12 is a diagram showing an example of a login screen in a second embodiment.

FIG. 13 is a flowchart showing login screen display processing in the second embodiment.

FIG. 14 is a flowchart showing lock control processing of an installation unit in a third embodiment.

DESCRIPTION OF EMBODIMENTS

First Embodiment

In a biological sample analysis device of a first embodiment, a description will be given as to a method in which a user is authenticated by logging in online or offline, switching is performed to execute processing accessible by the user depending on an authentication method, and the processing accessible by the user becomes more restrictive in the case of offline authentication. Examples of the biological sample analysis device include an automatic biochemical analysis device such as a DNA sequencer, an automatic immunological analysis device, a mass spectrometer used for clinical examination, and a coagulation analysis device configured to measure the coagulation time of blood.

<Configuration Example of Analysis Device>

FIG. 1 is a functional configuration diagram of a biological sample analysis device 101 according to the first embodiment. The biological sample analysis device 101 includes an installation unit 102, a data acquisition unit 103, a user interface unit 105, a data storage unit 106, an access switching unit 107 (restriction unit), an offline authentication unit 108, a communication unit 109, a control unit 110, and switches 120 and 121 (restriction units). The biological sample analysis device 101 is connected to an online authentication unit 150 via a network 160.

The installation unit 102 installs, fixes, or stores a biological sample. The installation unit 102 can be, for example, a rack that holds a container containing the biological sample, a sample stage, or the like. The installation unit 102 may have a sensor such as a reflection type photointerrupter, and may detect installation of the biological sample by the sensor.

The data acquisition unit 103 acquires data related to the biological sample. The data acquisition unit 103 can be a detection device configured to detect characteristics of the biological sample, such as a camera or an optical sensor. The characteristics of the biological sample installed on the installation unit 102 may be detected by the data acquisition unit 103 after undergoing necessary pretreatment. When the data acquisition unit 103 is a camera, the data acquisition unit 103 has an image sensor, a lens, a filter, and the like, and captures an image of the biological sample. The data acquisition unit 103 may also have a reading device configured to read sample information, such as a radio frequency identifier (RFID) tag reader or a barcode reader. In this case, the sample information is added to the container holding the biological sample in the form of, for example, an RFID tag or a barcode. The data acquired by the data acquisition unit 103 can be analyzed or processed by the control unit 110.

The user interface unit 105 is an interface through which a user inputs information such as authentication information and various kinds of data, and information is output to the user, and for example, the user interface unit 105 is formed of an output device such as a display and an input device such as a mouse or a keyboard. A touch panel may be used as the user interface unit 105 and may also serve as an input-and-output device. In this case, the user interface unit 105 displays characters and images on the panel to output information to the user, and the user inputs information by touching the panel.

The user interface unit 105 displays a GUI screen for the user to access each piece of processing of operating the biological sample analysis device 101. In the present disclosure, "user access to the processing of the analysis device" means that selections for executing each piece of processing of the biological sample analysis device 101 are output by the user interface unit 105 (output device), and the user uses the user interface unit 105 (input device) to input an execution instruction for each piece of processing. The processing of the biological sample analysis device 101 includes, for example, data acquisition processing, cleaning processing, data confirmation processing, maintenance processing, and the like. The data acquisition processing is processing of causing the data acquisition unit 103 to operate. The data confirmation processing is processing of accessing data stored in the data storage unit 106, and includes processing of referring to, editing, duplicating, moving, or deleting data. The cleaning processing is processing of cleaning a portion of the biological sample analysis device 101 that requires cleaning by operating a cleaning mechanism (cleaning liquid, pump, and the like) not shown. The maintenance processing is processing of confirming information related to alarms and device status stored in the data storage unit 106. The user interface unit 105 displays a GUI screen (such as a menu screen described later) configured to execute each piece of processing of the biological sample analysis device 101 on the display (output device), thereby making it possible to provide the user with selections. Processing selections can be configured to be output by voice from a speaker (output device), and instructions can be configured to be input by the user's voice from a microphone (input device). Of course, input and output by the GUI screen and input and output by voice can be used together.

Each piece of processing of the biological sample analysis device 101 is categorized into offline authentication user executable processing 1051 that can be executed when a user logs in by offline authentication, and offline authentication user non-executable processing 1052 that cannot be executed by a user when the offline authentication is in progress (that is, the user is prohibited from accessing the processing). On the other hand, when online authentication is performed, a user can access both the offline authentication user executable processing 1051 and the offline authentication user non-executable processing 1052.

The data storage unit 106 is an area of storing information such as data acquired by the data acquisition unit 103, data obtained by processing the above-described data by the control unit 110, alarms generated in the biological sample analysis device 101, operation history, and the like. The data storage unit 106 is configured by a storage medium such as a hard disk drive (HDD), a solid state drive (SSD), an optical disk, a magnetic disk, and a USB memory. The data storage unit 106 may be formed of one or more components.

The storage area of the data storage unit 106 is classified into an offline authentication user accessible area 1061 that can be accessed when a user logs in by offline authentication, and an offline authentication user inaccessible area 1062 that a user cannot access when the offline authentication is in progress (that is, the user is prohibited from accessing the area). When online authentication is performed, a user can access both the offline authentication user accessible area 1061 and the offline authentication user inaccessible area 1062. The offline authentication user accessible area 1061 includes information such as alarms generated in the biological sample analysis device 101 and operation history. The offline authentication user inaccessible area 1062 includes information such as data acquired by the data acquisition unit 103, an analysis result of the data (data related to a biological sample). The offline authentication user accessible area 1061 and the offline authentication user inaccessible area 1062 may be configured to be stored in different areas (data files) of the same storage medium. Alternatively, the offline authentication user accessible area 1061 and the offline authentication user inaccessible area 1062 may be configured to be respectively stored in different storage media.

The access switching unit 107 controls operations of the switches 120 and 121 to control execution of processing via the user interface unit 105 and access to the data stored in data storage unit 106. Specifically, when a user is authenticated by the offline authentication unit 108, the access switching unit 107 turns off the switch 120 to prohibit execution of the offline authentication user non-executable processing 1052. Further, the access switching unit 107 turns off the switch 121 to prohibit access to the offline authentication user inaccessible area 1062 of the data storage unit 106. Details of ON/OFF control of the switch will be described later.

The offline authentication unit 108 performs authentication processing based on authentication information input by a user via the user interface unit 105. The authentication information may be a combination of a user ID and a password, or may be biological information such as fingerprints, iris, or veins. When the authentication information matches information previously registered in the offline authentication unit 108, the authentication is successful, and the user can use each function of the biological sample analysis device 101.

The communication unit 109 is an interface configured to communicate with a component outside the biological sample analysis device 101, and can be configured by, for example, network connection, universal serial bus (USB) connection, an ultrasonic unit, an infrared communication device, and the like.

The control unit 110 is configured by a memory in which a program for operating each unit of the biological sample analysis device 101 is stored, a processor (CPU, MPU, or the like) configured to execute the program, and the like, and controls each unit of the biological sample analysis device 101. The control unit 110 may be a computer terminal such as a personal computer, a smart phone, or a tablet.

The switches 120 and 121 are mechanisms capable of switching between ON and OFF. In the case of ON, components connected to opposite ends of the switch can access each other. On the other end, in the case of OFF, the components connected to the opposite ends of the switch cannot access each other.

The online authentication unit 150 is, for example, a user authentication server, and performs authentication processing based on authentication information input by a user. The online authentication unit 150 is configured by a memory in which a program for performing online authentication of a user is stored, a processor configured to execute the program, and the like. In addition, the online authentication unit 150 has a communication interface such as network connection, USB connection, an ultrasonic unit, or an infrared communication device, and can communicate with a component outside the online authentication unit 150. The authentication information input from the user interface unit 105 is transmitted, by the communication unit 109, to the online authentication unit 150 via the network 160. Upon receiving the authentication information, the online authentication unit 150 performs authentication processing, and transmits a result of the authentication processing (information on authentication success, authentication failure, and the like) to the communication unit 109. The communication unit 109 outputs the result of the authentication processing to the control unit 110, and the control unit 110 allows the user to use each function of the biological sample analysis device 101 when the authentication is successful.

The network 160 enables communication between components connected to the network 160.

In the biological sample analysis device 101, user authentication processing is performed using at least one of the offline authentication unit 108 and the online authentication unit 150 according to environments and conditions. For example, the online authentication unit 150 is normally used for the user authentication processing, and the offline authentication unit 108 is used for the user authentication processing when communication with the online authentication unit 150 is not possible due to network abnormality or the like.

In FIG. 1, each unit of the biological sample analysis device 101 and the online authentication unit 150 are independent, but may be formed of one or more components. For example, the access switching unit 107, the offline authentication unit 108, and the communication unit 109 may be configured to perform the processing thereof using one or more processors (CPU, MPU, and the like). Further, in FIG. 1, all units of the biological sample analysis device 101 are provided inside the biological sample analysis device 101, but one or more units may be disposed outside and connected to the biological sample analysis device 101 through network connection, universal serial bus (USB) connection, or the like. For example, the data storage unit 106 may be provided outside the biological sample analysis device 101.

<Authentication Method>

FIG. 2 is a diagram showing an example of a login screen. In order to safely manage confidential data handled by the biological sample analysis device 101, when activation of the biological sample analysis device 101 is completed, when there is no user operation for a certain period of time, or when a logged-in user logs out, the control unit 110 displays the login screen on the user interface unit 105 and requests the user to enter authentication information. As shown in FIG. 2, the login screen has boxes for the user to enter a user ID and a password, and when the user enters authentication information and presses a login button, the control unit 110 starts login processing. The login button may not be necessarily displayed on the login screen, and the login processing may be automatically started when the authentication information is entered correctly.

Although FIG. 2 shows an example of performing authentication by entering the user ID and the password, the login screen may include a text prompting the user to enter biological information when a biometrics method is adopted as the authentication method. For example, an instruction is displayed in text to cause a user to touch a sensor for biological recognition or bring his or her eyes closer to a camera.

FIG. 3 is a flowchart showing login processing. A flow of the login processing in FIG. 3 starts when a user presses the login button on the login screen.

(Step S301)

The control unit 110 determines whether communication with the online authentication unit 150 is possible via the communication unit 109. When the communication can be performed (YES), the processing proceeds to step S302, and when the communication cannot be performed (NO), the processing proceeds to step S308.

(Step S302)

The online authentication unit 150 performs online authentication. Specifically, the control unit 110 first transmits authentication information input by a user from the login screen or information obtained by processing the authentication information by encryption or the like to the online authentication unit 150 via the communication unit 109. Next, the online authentication unit 150 determines that authentication is successful when the received authentication information matches previously registered information, and otherwise determines that authentication is not successful. Finally, the online authentication unit 150 transmits a result of authentication processing (information on authentication success, authentication failure, and the like) to the communication unit 109. The communication unit 109 outputs the result of the authentication processing by the online authentication unit 150 to the control unit 110.

(Step S303)

The control unit 110 determines whether the authentication result received from the online authentication unit 150 is successful. In the case of success (YES), the processing proceeds to step S304, and in the case of failure (NO), the processing proceeds to step S306.

(Step S304)

The control unit 110 turns on the switch 120 by the access switching unit 107 to permit (release) access to the offline authentication user non-executable processing 1052. Further, the control unit 110 turns on the switch 121 by the access switching unit 107 to permit access to the offline authentication user inaccessible area 1062 of the data storage unit 106. When the processing of step S304 ends, the processing proceeds to step S305.

(Step S305)

The control unit 110 executes login by online authentication, and displays, for example, a menu screen (described later in FIG. 5) on the user interface unit 105. As a result, the user can access the processing and data storage areas where access is permitted via the user interface unit 105. When the processing of step S305 ends, the control unit 110 ends a series of login processing.

(Step S306)

The control unit 110 displays error information related to login failure on the user interface unit 105. The error information can be displayed, for example, as a dialog screen (described later in FIG. 4(a)). When the processing of step S306 ends, the processing proceeds to step S307.

(Step S307)

The control unit 110 displays the login screen again on the user interface unit 105 without executing the login processing. When the processing of step S307 ends, the control unit 110 ends a series of login processing.

(Step S308)

When communication with the online authentication unit 150 is not possible, the control unit 110 displays error information related to communication abnormality on the user interface unit 105. The error information can be displayed, for example, as a dialog screen (described later in FIG. 4(b)). When the processing of step S308 ends, the processing proceeds to step S309.

(Step S309)

The offline authentication unit 108 performs offline authentication. Specifically, the control unit 110 transmits, to the offline authentication unit 108, authentication information input by a user from the login screen, or information obtained by processing the authentication information by encryption or the like. Next, the offline authentication unit 108 determines that authentication is successful when the received authentication information matches previously registered information, and otherwise determines that authentication is not successful. Finally, the offline authentication unit 108 transmits a result of authentication processing (information on authentication success, authentication failure, and the like) to the control unit 110. When the processing of step S309 ends, the processing proceeds to step S310.

(Step S310)

The control unit 110 determines whether the authentication result received from the offline authentication unit 108 is successful. In the case of successful (YES), the processing proceeds to step S311, and in the case of failure (NO), the processing proceeds to step S313.

(Step S311)

The control unit 110 turns off the switch 120 by the access switching unit 107 to prohibit (shield) access to the offline authentication user non-executable processing 1052. Further, the control unit 110 turns off the switch 121 by the access switching unit 107 to prohibit access to the offline authentication user inaccessible area 1062 of the data storage unit 106. When the processing of step S311 ends, the processing proceeds to step S312.

(Step S312)

The control unit 110 executes login by offline authentication, and displays, for example, a menu screen (described later in FIG. 5) on the user interface unit 105. When the processing of step S312 ends, the control unit 110 ends a series of login processing.

(Step S313)

The control unit 110 displays error information related to login failure on the user interface unit 105. The error information can be displayed, for example, as a dialog screen (described later in FIG. 4(a)). When the processing of step S313 ends, the processing proceeds to step S314.

(Step S314)

The control unit 110 displays the login screen again on the user interface unit 105 without executing the login processing. When the processing of step S314 ends, the control unit 110 ends a series of login processing.

<Screen Display Example>

FIGS. 4(a) and 4(b) are diagrams showing examples of a dialog screen in the login processing. FIG. 4(a) shows an example of a dialog screen when login fails. When login failure occurs as in steps S306 and S313 in FIG. 3, the control unit 110 displays the dialog screen as shown in FIG. 4(a) on the user interface unit 105 to notify a user of occurrence of the login failure. The dialog screen of FIG. 4(a) displays a text indicating that a login ID or a password is not correct.

FIG. 4(b) shows an example of a dialog screen when communication is abnormal. When communication abnormality with the online authentication unit 150 occurs as in step S308 in FIG. 3, the control unit 110 displays the dialog screen as shown in FIG. 4(b) on the user interface unit 105 to notify a user of occurrence of the communication abnormality. The dialog screen of FIG. 4(b) displays a text indicating that connection with the user management server (online authentication unit) is not possible.

FIGS. 5(a) to 5(e) are diagrams showing examples of screen transition when authentication in login processing is successful. FIGS. 5(a) and 5(b) show screen transition in the user interface unit 105 when online authentication is successful (in the case of transition in the order of steps S301, S302, S303, S304, and S305 in FIG. 3). When a user enters a user ID and a password on a login screen of FIG. 5(a) and presses a "login" button, the screen transitions to a menu screen of FIG. 5(b). As shown in FIG. 5(b), the menu screen has menu buttons for "data acquisition preparation", "data acquisition execution", "cleaning preparation", "cleaning execution", "acquired data confirmation", and "maintenance", and displays a text at the bottom of the screen, the text indicating that online authentication of a user X is in progress.

FIGS. 5(c) to 5(e) show screen transition in the user interface unit 105 when offline authentication is successful (in the case of transition in the order of steps S301, S308, S309, S310, S311, and S312 in FIG. 3). When a user enters a user ID and a password on a login screen of FIG. 5(c) and presses a "login" button, the screen transitions to a dialog screen of FIG. 5(d) indicating communication abnormality. In FIG. 5(d), when the user presses an "OK" button, the screen transitions to a menu screen of FIG. 5(e).

Although the same menu buttons are displayed on the menu screen of FIG. 5(b) and the menu screen of FIG. 5(e), the display of whether online authentication is in progress or offline authentication is in progress is different.

FIG. 6 is a diagram showing a list of processing in the biological sample analysis device 101. As shown in FIG. 6, the processing of the biological sample analysis device 101 is categorized into, for example, (a) data acquisition processing, (b) cleaning processing, (c) data confirmation processing, and (d) maintenance processing. The (a) data acquisition processing is classified into (a-1) data acquisition preparation (installation of a waste liquid tank, a reagent, a sample, and the like required for data acquisition of the biological sample) processing and (a-2) data acquisition execution (acquisition of biological sample data) processing. The (b) cleaning processing is classified into (b-1) cleaning preparation (installation of a waste liquid tank, a reagent, a sample, and the like required for cleaning) processing and (b-2) cleaning execution (cleaning of a flow path inside a piping) processing. The (c) data confirmation processing is processing of accessing data stored in the data storage unit 106, and is classified into (c-1) reference processing of data related to a biological sample and an analysis result thereof, (c-2) editing processing of data related to a biological sample and an analysis result thereof, (c-3) duplication processing of data related to a biological sample and an analysis result thereof, and (c-4) transfer processing of data related to a biological sample and an analysis result thereof, and (c-5) deletion processing of data related to a biological sample and an analysis result thereof. The (d) maintenance processing is classified into (d-1) alarm confirmation (confirmation of generated alarms) processing and (d-2) device status confirmation (confirmation of operation history and status of consumables) processing.

FIG. 6 also shows whether the offline authentication user can execute (access) each piece of processing. In the example of FIG. 6, among the above-described processing, for example, (a-1) and (a-2) are set as the offline authentication user non-executable processing 1052, and (c-1), (c-2), (c-3), (c-4), and (c-5) are set as the offline authentication user inaccessible area 1062. Further, in the example of FIG. 6, processing related to maintenance of the biological sample analysis device 101, such as (b) cleaning processing and (d) maintenance processing, can be executed even when the offline authentication is performed. Accordingly, biological sample data, which is confidential information, can be safely managed while maintenance performance of the biological sample analysis device 101 is maintained.

Alternatively, a user who has logged in by offline authentication may be prevented from executing a part of the classified processing described above. For example, with respect to (c-1), the offline authentication user executable processing 1051 may be set so that a user can refer to data acquired by the user himself or herself and an analysis result thereof, and the offline authentication user non-executable processing 1052 may be set so that a user cannot refer to data acquired by other users and an analysis result thereof.

FIGS. 7(a) and 7(b) are diagrams showing an example of screen transition in a case where a user selects data acquisition preparation processing on a menu screen when offline authentication is in progress. FIG. 7(a) shows a menu screen (similar to that of FIG. 5(e)) displayed on the user interface unit 105 when offline authentication is successful. On the menu screen of FIG. 7(a), when a user who has logged in by offline authentication selects a "data acquisition preparation" button, the screen transitions to a dialog screen of FIG. 7(b), the dialog screen indicating that processing cannot be executed.

FIG. 7(b) shows the dialog screen that informs the user that the "data acquisition preparation" processing cannot be executed. The dialog screen of FIG. 7(b) includes a text indicating that preparations for data acquisition cannot be started because offline authentication is in progress. By such screen transition in the user interface unit 105, the user who has logged in by the offline authentication cannot execute the data acquisition preparation processing. When the user selects an "OK" button on the dialog screen, the screen may return to the menu screen of FIG. 7(a).

On the other hand, when a user who has logged in by online authentication selects a "data acquisition preparation" button on the menu screen (for example, FIG. 5(b)), the control unit 110 starts the data acquisition preparation processing.

FIGS. 8(a) and 8(b) are diagrams showing an example of screen transition in a case where a user selects data acquisition execution processing when offline authentication is in progress. FIG. 8(a) shows a menu screen (similar to that of FIG. 5(e)) displayed on the user interface unit 105 when offline authentication is successful. On the menu screen of FIG. 8(a), when the user who has logged in by the offline authentication selects a "data acquisition execution" button, the screen transitions to a dialog screen of FIG. 8(b), the dialog screen indicating that processing cannot be executed.

FIG. 8(b) shows the dialog screen that informs the user the "data acquisition execution" processing cannot be executed. The dialog screen of FIG. 8(b) includes a text indicating that data acquisition cannot be started because offline authentication is in progress. By such screen transition in the user interface unit 105, the user who has logged in by the offline authentication cannot execute the data acquisition processing. When the user selects an "OK" button on the dialog screen, the screen may return to the menu screen of FIG. 8(a).

On the other hand, when the user who has logged in by the online authentication selects the "data acquisition execution" button on the menu screen (for example, FIG. 5(b)), the control unit 110 drives the data acquisition unit 103 to start the data acquisition processing.

FIGS. 9(a) and 9(b) are diagrams showing examples of screen transition in a case where a user selects the data confirmation processing when offline authentication is in progress. FIG. 9(a) shows a menu screen (similar to that of FIG. 5(e)) displayed on the user interface unit 105 when offline authentication is successful. On the menu screen of FIG. 9(a), when a user who has logged in by offline authentication selects an "acquired data confirmation" button, the screen transitions to a dialog screen of FIG. 9(b), the dialog screen indicating that processing cannot be executed.

FIG. 9(b) shows the dialog screen that informs the user that "acquired data confirmation" processing cannot be executed. The dialog screen of FIG. 9(b) includes a text indicating that the acquired data cannot be confirmed because offline authentication is in progress. By such screen transition in the user interface unit 105, the user who has logged in by the offline authentication cannot execute the data confirmation processing.

FIGS. 9(c) to 9(e) are diagrams showing another example of screen transition in the case where a user selects the data confirmation processing when offline authentication is in progress. On a menu screen in FIG. 9(c), when a user who has logged in by offline authentication selects an "acquired data confirmation" button, the screen transitions to an acquired data list screen of FIG. 9(d). FIG. 9(d) shows a screen of a list of acquired data when offline authentication is in progress, and the list of data has items such as an "ID", an "acquired date and time", and an "acquisition user" as an example. When a logged-in user (User X) selects data acquired by another user (User A) from the list of data and selects a "confirmation" button, the screen transitions to a dialog screen of FIG. 9(e), the dialog screen indicating that processing cannot be executed. Here, the transition to the screen of FIG. 9(e) may be performed only when the user who has acquired the data selected in FIG. 9(d) does not match the logged-in user. The dialog screen of FIG. 9(e) includes a text indicating that data acquired by other users cannot be confirmed because offline authentication is in progress.

As described above, in FIGS. 7 to 9, a dialog screen is displayed when a user who has logged in by offline authentication selects a menu for processing that cannot be executed (processing that a user is prohibited from accessing), thereby preventing start of the processing. Alternatively, a button may be set to an inactive state (a state in which a button does not work even if the button is selected) so that the menu that cannot be executed cannot be selected.

FIG. 10(a) is a diagram showing another example of the button display on the menu screen when the offline authentication is in progress. In the example shown in FIG. 10(a), the "data acquisition preparation" button, the "data acquisition execution" button, and the "acquired data confirmation" button are inactive, and a user who has logged in offline cannot select these buttons.

FIG. 10(b) is a diagram showing another example of the screen of the list of the acquired data when the offline authentication is in progress. As shown in FIG. 10(b), when a user (User X) is logged in and data acquired by another user (User A) (unconfirmable data) is selected from the list of data, a "confirmation" button is inactive, and as such, the user cannot select the confirmation button.

In this manner, in the user interface unit 105, by deactivating a button for processing that a user is prohibited from accessing when offline authentication is performed, a user who has logged in by offline authentication cannot execute a part of processing such as the data acquisition preparation processing, the data acquisition processing, and the data confirmation processing. Further, instead of deactivating a button, a button itself for processing that the user is prohibited from accessing when offline authentication is performed may not be displayed.

In FIGS. 7(a) and 7(b), it is described that, in the case where the user selects the "data acquisition preparation" button on the menu screen when the offline authentication is in progress, the dialog screen indicating that the data acquisition preparation processing cannot be executed is displayed. As a modification, in the case where a user selects the "data acquisition preparation" button on the menu screen even when offline authentication is in progress, a screen prompting installation of a biological sample may be displayed.

FIGS. 11(a) and 11(b) are diagrams showing another example of the screen transition in the case where a user selects the data acquisition preparation processing on the menu screen when the offline authentication is in progress. FIG. 11(a) shows a sample installation screen when offline authentication is in progress. As shown in FIG. 11(a), the sample installation screen displays a text instructing a user to install a sample on the installation unit 102 and a schematic diagram showing appearance of the biological sample analysis device 101 and a position of the installation unit 102. When the user installs the sample on the installation unit 102 and selects a "complete" button on the sample installation screen, the screen transitions to a dialog screen of FIG. 11(b), the dialog screen indicating that installation is not possible. The dialog screen of FIG. 11(b) includes a text indicating that the sample cannot be installed because offline authentication is in progress. By such screen transition in the user interface unit 105, the user who has logged in by the offline authentication cannot install the biological sample on the installation unit 102.

The dialog screen of FIG. 11(b) may indicate, for example, that reading processing for information on the sample installed on the installation unit 102 cannot be executed. Even in the case where a user selects the "complete" button on the sample installation screen when the offline authentication is in progress, the control unit 110 displays the dialog screen of FIG. 11(b) on the user interface unit 105 without executing processing of accepting the installed sample and without reading the information on the installed sample with a reading device.

On the other hand, in the case where a user selects the "complete" button on the sample installation screen when online authentication is in progress, the control unit 110 accepts the sample installation. Specifically, the control unit 110 identifies the installed sample by acquiring information on the sample based on a detection signal of the reading device.

Summary of First Embodiment

As described above, in the biological sample analysis device of the present embodiment, a user is authenticated by logging in online or offline, and processing accessible by the user varies depending on an authentication method. When the user is authenticated by an offline authentication unit, processing accessible by the user is restricted more than when the user is authenticated by an online authentication unit. As a result, when online authentication is in progress, user convenience and security during authentication are improved, and confidential data handled by the biological sample analysis device can be safely managed even when offline authentication is in progress.

Second Embodiment

In the first embodiment, it is described that in a case where a user selects a menu button for processing that a user is prohibited from accessing when offline authentication is in progress, a dialog screen indicating that the processing cannot be executed is displayed. As another example of how to restrict processing accessible when offline authentication is in progress, in a second embodiment, a method of switching the display of a login screen depending on whether online authentication of a user is possible will be described.
<Configuration Example of Analysis Device>

A configuration of a biological sample analysis device in the second embodiment is the same as the biological sample analysis device 101 in the first embodiment (FIG. 1). However, the biological sample analysis device of the second embodiment has two types of operation modes including diagnosis use (Closed Mode, In-Vitro Diagnostics) and research use (Open Mode, Research Use Only). In general, data for diagnosis use is considered to be more confidential than data for research use and is required to be managed more safely.
<Method of Displaying Login Screen>

FIGS. 12(*a*) and 12(*b*) are diagrams showing examples of a login screen in the second embodiment. As shown in FIGS. 12(*a*) and 12(*b*), in the present embodiment, a radio button for research use and a radio button for research use are displayed on the login screen. FIG. 12(*a*) shows a login screen during online operation, in which the communication unit 109 is in a state where communication with the online authentication unit 150 is possible. During online operation, both the radio button for research use and the radio button for diagnosis use on the login screen are active and selectable by a user.

FIG. 12(*b*) shows a login screen during offline operation, in which the communication unit 109 is in a state where communication with the online authentication unit 150 is not possible. During offline operation, the radio button for research use is active and selectable, but the radio button for diagnosis use is inactive and not selectable. By displaying the screen on the user interface unit 105 in this manner, the biological sample analysis device 101 cannot be operated for diagnosis use during offline operation.

FIG. 13 is a flowchart showing login screen display processing in the second embodiment. When activation of the biological sample analysis device 101 is completed, when there is no user operation for a certain period of time, or when a logged-in user logs out, the control unit 110 executes a flow shown in FIG. 13 to display the login screen on the user interface unit 105 and requests the user to enter authentication information.
(Step S1301)

The control unit 110 determines whether communication with the online authentication unit 150 is possible via the communication unit 109. When the communication is possible (YES), the processing proceeds to step S1302, and when the communication is not possible (NO), the processing proceeds to step S1304.
(Step S1302)

The control unit 110 activates a radio button for diagnosis use on the login screen. When the processing of step S1302 ends, the processing proceeds to step S1303.
(Step S1303)

The control unit 110 displays the login screen on the user interface unit 105. When the processing of step S1303 ends, the control unit 110 ends a series of flows of the login screen display processing.
(Step S1304)

The control unit 110 deactivates the radio button for diagnosis use on the login screen. When the processing of step S1304 ends, the processing proceeds to step S1305.
(Step S1305)

The control unit 110 displays the login screen on the user interface unit 105. When the processing of step S1305 ends, the control unit 110 ends a series of flows indicated by the login screen display processing.
<Authentication Method>

When a user enters a user ID and a password on the login screen and presses a "login" button, the control unit 110 starts login processing. Since the details of the login processing are the same as those of the first embodiment (FIG. 3), a description thereof will be omitted. When online authentication is successful, the operation mode of the biological sample analysis device 101 follows the mode selected by the user with the radio button on the login screen. When offline authentication is successful, the operation mode of the biological sample analysis device 101 is set to research use.

Summary of Second Embodiment

As described above, in the biological sample analysis device of the present embodiment, the display of the login screen is switched depending on whether online authentication of a user is possible, the operation mode for diagnosis use and the operation mode for research use are permitted when online authentication is in progress, and the operation mode for diagnosis use is prohibited when offline authentication is in progress. In this manner, by restricting the operation mode when offline authentication is in progress, confidential data handled by the device can be safely managed.

Third Embodiment

In the first and second embodiments, a technique of restricting processing accessible by a user when the user logs in by offline authentication has been described. In a third embodiment, proposed is a technique of restricting removal of a sample from an installation unit by locking the installation unit when a user logs in by offline authentication and the biological sample is installed on the installation unit of a biological sample analysis device.

Since a configuration of the biological sample analysis device in the third embodiment is the same as that of the biological sample analysis device 101 in the first embodiment (FIG. 1), a description thereof will be omitted.

<Lock Control Method of Installation Unit>

FIG. 14 is a flowchart showing lock control processing of the installation unit in the third embodiment. When the activation of the biological sample analysis device 101 is completed, when there is no user operation for a certain period of time, or when a logged-in user logs out, the control unit 110 executes a flow shown in FIG. 14 to lock the installation unit 102.

In FIG. 14, steps S1401 to S1404 are processing of locking the installation unit 102 when online authentication of the user is not possible and the biological sample has been installed on the installation unit 102. Further, steps S1405 to S1409 are processing in which the locked installation unit 102 is not unlocked until online authentication is successful.

(Step S1401)

The control unit 110 determines whether communication with the online authentication unit 150 is possible via the communication unit 109. When the communication is possible (YES), the control unit 110 ends a series of processing without locking the installation unit 102. When the communication is not possible (NO), the processing proceeds to step S1402.

(Step S1402)

The control unit 110 determines whether a biological sample is installed on the installation unit 102. Specifically, for example, whether the biological sample is installed thereon can be determined by whether a tag attached to the sample can be read by a reading device provided in the data acquisition unit 103. Alternatively, for example, a sensor such as a reflection type photointerrupter may be provided in the installation unit 102, and the sensor may detect that the biological sample is installed thereon. When the biological sample is installed (YES), the processing proceeds to step S1403. When the biological sample is not installed (NO), a series of processing ends.

(Step S1403)

The control unit 110 determines whether the installation unit 102 is locked. When the installation unit 102 is locked (YES), the processing proceeds to step S1405, and when the installation unit 102 is not locked (NO), the processing proceeds to step S1404.

(Step S1404)

The control unit 110 locks the installation unit 102. When the processing of step S1404 ends, the processing proceeds to step S1405.

(Step S1405)

The control unit 110 determines whether communication with the online authentication unit 150 is possible via the communication unit 109. When the communication is possible (YES), the processing proceeds to step S1406, and when the communication is not possible (NO), the control unit 110 repeats step S1405.

(Step S1406)

The control unit 110 determines whether there is a request to unlock the installation unit 102. The request to unlock is generated, for example, when the data acquisition processing is completed and the sample on the installation unit 102 can be taken out. When there is the request to unlock (YES), the processing proceeds to step S1407, and when there is no request to unlock (YES), a series of processing ends.

(Step S1407)

The online authentication unit 150 performs online authentication. Contents of the processing of this step are the same as those of step S302 described in the first embodiment. When the processing of step S1407 ends, the processing proceeds to step S1408.

(Step S1408)

The control unit 110 determines whether an authentication result received from the online authentication unit 150 is successful. When the authentication result is successful (YES), the processing proceeds to step S1409, and when the authentication result is unsuccessful (NO), a series of processing ends.

(Step S1409)

The control unit 110 unlocks the installation unit 102. When the processing of step S1409 ends, a series of processing ends.

Summary of the Third Embodiment

As described above, the biological sample analysis device of the present embodiment locks an installation unit when online authentication of a user is not possible and a biological sample is installed on the installation unit. As a result, the user cannot take out the biological sample, and the risk of loss or theft of the biological sample is reduced, and as such, the biological sample handled by the device can be safely managed.

[Modifications]

The present disclosure is not limited to the embodiments described above, and includes various modifications. For example, the above-described embodiments have been described in detail to explain the present disclosure in an easy-to-understand manner, and do not necessarily include all the configurations described above. Further, a part of one embodiment can be replaced with a configuration of another embodiment. Additionally, the configuration of another embodiment can be added to the configuration of one embodiment. Furthermore, a part of the configuration of another embodiment can be added to, deleted from, or replaced with a part of the configuration of each embodiment.

In each of the above-described embodiments, a technique of a biological sample analysis device has been described. The technique of each embodiment can be applied to any analysis device that acquires data related to samples other than a biological sample.

REFERENCE SIGNS LIST

101: biological sample analysis device
102: installation unit
103: data acquisition unit
105: user interface unit
106: data storage unit
107: access switching unit
108: offline authentication unit
109: communication unit
110: control unit
120: switch
121: switch
150: online authentication unit
160: network

The invention claimed is:

1. An analysis device configured to acquire data related to a sample, comprising:
   an installation unit configured to install the sample thereon;
   a data acquisition unit configured to acquire the data related to the sample;
   a data storage unit for storing the data;
   a user interface unit configured to allow a user to access processing of the analysis device;
   a communication unit configured to communicate with an online authentication unit configured to authenticate the user online;
   an offline authentication unit configured to authenticate the user offline when the communication unit cannot communicate with the online authentication unit;
   a restriction unit configured to, when the user is authenticated by the offline authentication unit, restrict processing accessible by the user to a level lower than when the user is authenticated by the online authentication unite, unit; and
   an access switching unit for switching an access permission to the data storage unit,
   wherein the data storage unit has an offline authenticated user accessible area storing data that is permitted to be accessed, and an offline authenticated user inaccessible area storing data that is not permitted to be accessed when the user is authenticated by the offline authentication unit,
   wherein the offline authenticated user accessible area and the offline authenticated user inaccessible area are configured by different storage media, and
   wherein when the user is authenticated by the offline authentication unit, the restriction unit prohibits access to the offline authenticated user inaccessible area using the access switching unit.

2. The analysis device according to claim 1, wherein the restriction unit, when the user is authenticated by the offline authentication unit, prohibits at least one of access to a part of processing executable when the user is authenticated by the online authentication unit or access to a part of a data area accessible when the user is authenticated by the online authentication unit.

3. The analysis device according to claim 1, wherein the restriction unit, when the user is authenticated by the offline authentication unit, prohibits execution of at least one part of processing of starting acquisition preparation for the data related to the sample and processing of starting acquisition of the data related to the sample.

4. The analysis device according to claim 1, wherein the restriction unit, when the user is authenticated by the offline authentication unit, prohibits execution of at least one part of processing among editing, duplicating, moving, and deleting the data related to the sample.

5. The analysis device according to claim 1, wherein the restriction unit, when the user is authenticated by the offline authentication unit, prohibits execution of at least one part of processing among editing, duplicating, moving, and deleting the data related to the sample, in which the data is obtained by a user different from the authenticated user.

6. The analysis device according to claim 1, wherein the restriction unit, when the user is authenticated by the offline authentication unit, prohibits access to a storage area of data related to a sample, in which the data is acquired by a user different from the authenticated user, among the areas of the data storage unit.

7. The analysis device according to claim 1, wherein the restriction unit, when the user is authenticated by the offline authentication unit, prohibits execution of processing of installing the sample on the installation unit.

8. The analysis device according to claim 1, wherein the user interface unit, when the user is authenticated by the offline authentication unit, provides error information when the user attempts to access the processing restricted by the restriction unit.

9. The analysis device according to claim 1, wherein the user interface unit, when the user is authenticated by the offline authentication unit, deactivates an interface configured to access the processing restricted by the restriction unit.

10. The analysis device according to claim 1, wherein the analysis device operates in an operation mode for diagnosis use and an operation mode for research use,
    wherein the restriction unit, when the user is authenticated by the offline authentication unit, prohibits execution of the operation mode for the diagnosis use.

11. The analysis device according to claim 1, characterized in that the installation unit is locked when the communication unit does not communicate with the online authentication unit and the sample is installed on the installation unit.

12. The analysis device according to claim 11, wherein the installation unit, when being locked, maintains a locked state until authentication by the online authentication unit is successful.

13. A method of authenticating a user of an analysis device, characterized by comprising:
    determining, by a processor of the analysis device, whether communication with an online authentication unit configured to authenticate the user online is executable;
    authenticating, by the processor, the user offline when the communication with the online authentication unit is not executable;
    restricting, by the processor, when the user is authenticated by the offline authentication unit, processing accessible by the user to a level lower than when the user is authenticated by the online authentication unit; and
    an access switching unit for switching an access permission to the data storage unit,
    wherein the data storage unit has an offline authenticated user accessible area storing data that is permitted to be accessed, and an offline authenticated user inaccessible area storing data that is not permitted to be accessed when the user is authenticated by the offline authentication unit,
    wherein the offline authenticated user accessible area and the offline authenticated user inaccessible area are configured by different storage media, and
    wherein when the user is authenticated by the offline authentication unit, the restriction unit prohibits access to the offline authenticated user inaccessible area using the access switching unit.

* * * * *